United States Patent [19]

Goshgarian

[11] 3,798,751

[45] Mar. 26, 1974

[54] METHOD OF MAKING AN ELECTROLYTIC CELL
[75] Inventor: Haig Goshgarian, Woodland Hills, Calif.
[73] Assignee: The Bissett-Berman Corporation, Santa Monica, Calif.
[22] Filed: June 3, 1971
[21] Appl. No.: 149,476

[52] U.S. Cl. ............................................ 29/570
[51] Int. Cl............................................ B01j 17/00
[58] Field of Search ............ 29/570, 25.41; 317/230

[56] References Cited
UNITED STATES PATENTS
3,056,072  9/1962  Schroader et al.................. 317/230
3,461,355  8/1969  Fry.................................. 29/570 X
3,323,026  5/1967  Minami et al..................... 29/570 X Primary Examiner—Charles W. Lanham
Assistant Examiner—W. C. Tupman
Attorney, Agent, or Firm—Smyth, Roston & Pavitt

[57] ABSTRACT

An improved method of making an electrolytic cell including the step of filling with an electrolyte a first electrode having the form of a container. A plug having a hole therethrough is inserted into the first electrode to a particular position. A second electrode having an enlarged portion is inserted through the hole of the plug until the enlarged portion comes into physical contact with the plug. A sealant is disposed within the container to surround the enlarged portion of the second electrode and make a physical bond with the first electrode.

11 Claims, 8 Drawing Figures

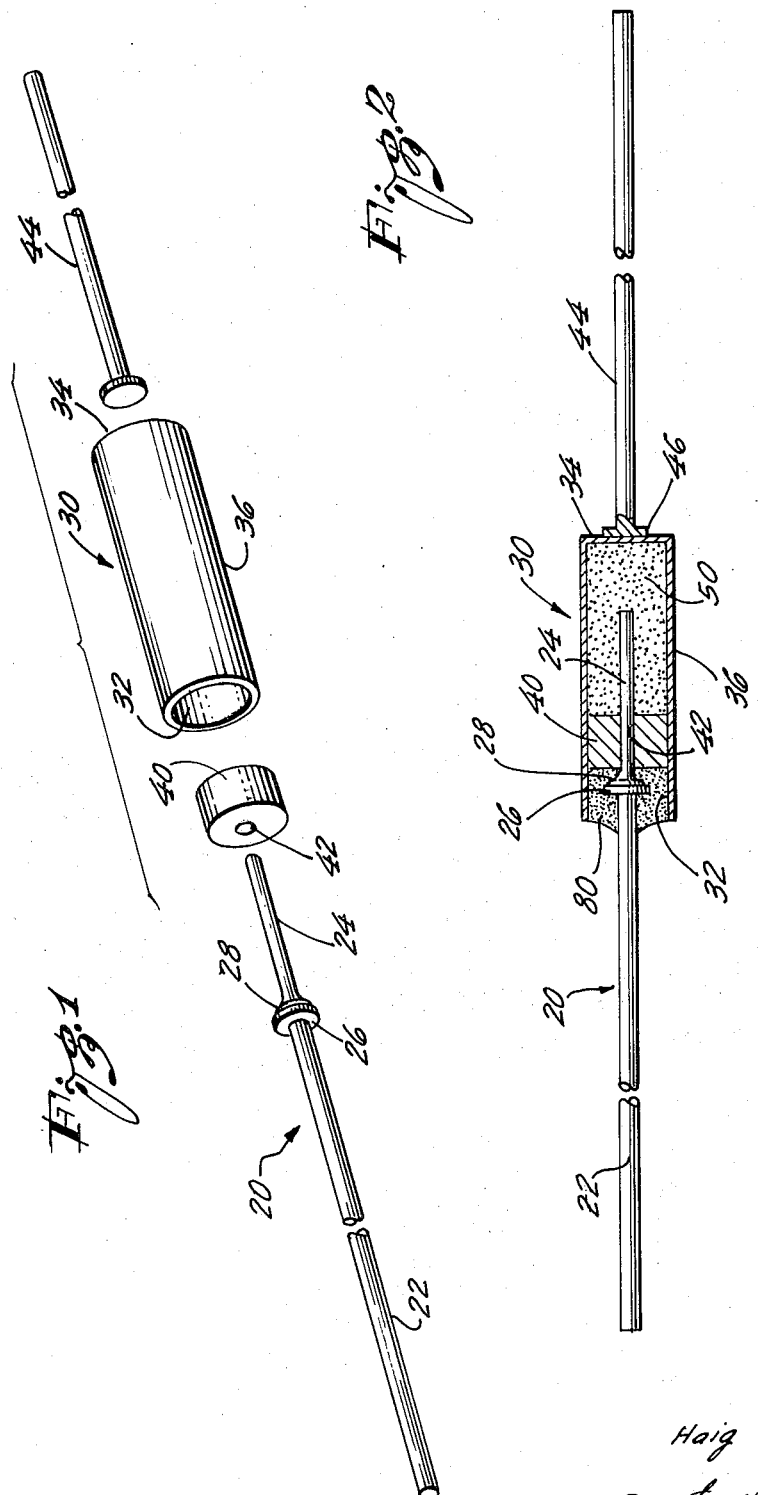

PATENTED MAR 26 1974  3,798,751
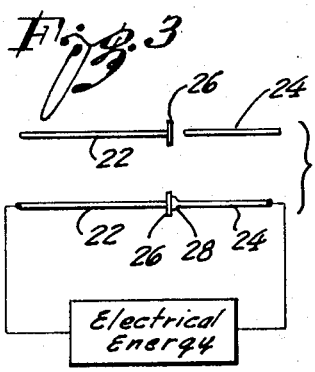
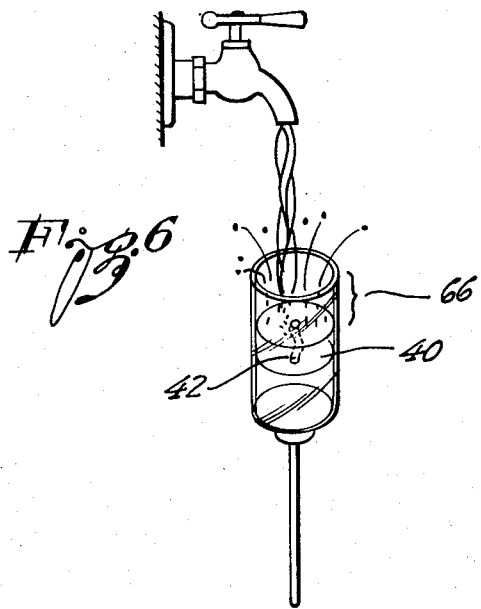
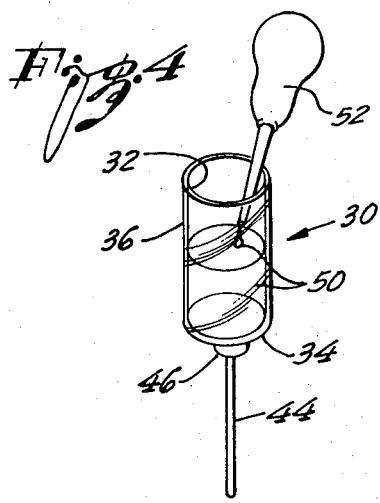
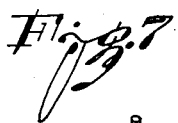
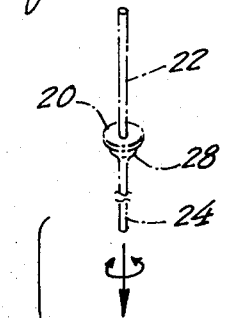
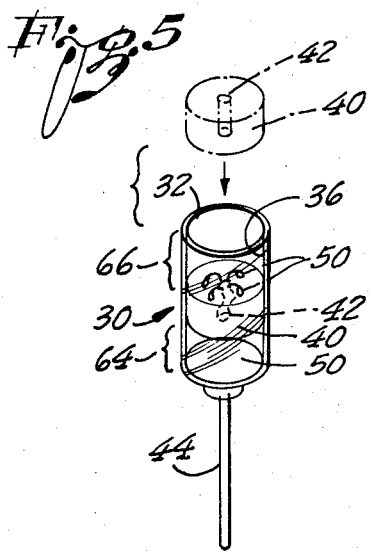
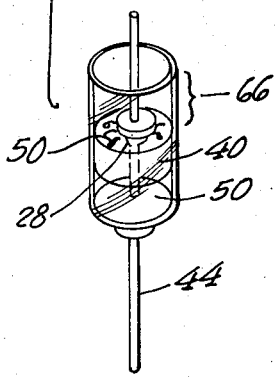
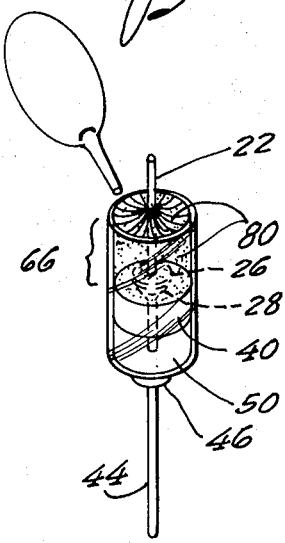
INVENTOR:
Haig Goshgarian
ATTORNEYS 3,798,751

METHOD OF MAKING AN ELECTROLYTIC CELL

This invention relates in general to electrolytic cells and more particularly to an improved method of making electrolytic cells.

Electrolytic cells of the prior art include at least two electrodes that are in contact with an electrolyte. One of the electrodes, such as an outer electrode, may be formed as a container to contain the electrolyte. The outer electrode includes at least a portion of its inner surface which is made from an active material such as silver. As an alternative, the outer electrode may be made entirely of the active material such as silver. The outer electrode or container electrolyte in the prior art electrolytic cells have been made in the shape of a cylinder or cup having an open end and a closed end. At least one inner electrode is sealed within the open end of the container using at least one insulating member, for insulating the outer electrode from the inner electrode. For example, one successful sealing technique has been to place an insulating member on either side of a flange portion of the inner electrode and to form a seal by crimping the open end of an enlarged portion of the container against one of the insulating members.

Prior art systems that are constructed in accordance with the above-described principles are disclosed in U.S. Pat. No. 3,423,648, issued Jan. 21, 1969, in the name of Martin Mintz, and assigned to Bissett-Berman Corporation, in U.S. Pat. No. 3,423,643, issued Jan. 21, 1969, in the name of Edmund A. Miller, and assigned to the Bissett-Berman Corporation, in U.S. Pat. No. 3,423,642, issued Jan. 21, 1969, in the name of Edward J. Plehal, Gene Frick, and Martin Mintz, and assigned to the Bissett-Berman Corporation, and in U.S. Pat. No. 3,423,644, issued Jan. 21, 1969, in the name of Martin Minz, and assigned to the Bissett-Berman Corporation.

Filling the container electrode to the desired level and then crimping the open end of the container to provide a seal as done in the prior art is an acceptable method of making electrolytic cells. To construct electrolytic cells which are cheaper in construction an improved method of making an electrolytic cell is desirable. The method of the present invention can be used irrespective of the size of the electrolytic cells to provide electrolytic cells that can be manufactured at a lower cost than that in the prior art electrolytic cells. The description of the method of the present invention is shown with reference to an improved form of electrolytic cell which is smaller in size than prior art electrolytic cells and the construction of which is shown in U.S. application Ser. No. 27,639, filed in the name of Robert Roese on Apr. 13, 1970 and assigned to the same assignee as the instant case.

The present invention provides for the improved method of making an electrolytic cell including the step of filling, with an electrolyte a first electrode in the form of a container. A dye can be added to the electrolyte so that the electrolyte can be easily visually detected. The first electrode includes an open end, a wall, and a closed end. A plug having a hole therethrough is inserted through the open end of the first electrode to a particular position within the wall of the first electrode. The open end of the first electrode may be washed to eliminate any excess electrolyte. A second electrode having an enlarged portion is inserted through the hole of the plug until the enlarged portion, which provides for a mechanical stop, makes physical contact with the plug. The open end of the first electrode may again be washed to eliminate any excess electrolyte. A lead member may be welded to form the enlarged portion of the second electrode. A sealant is placed in the open end of the first electrode to prevent the escape of any electrolyte. The sealant further bonds the enlarged portion of the second electrode to the first electrode to prevent the displacement of the second electrode.

The above and other objects, features, and advantages of the present invention will become more apparent with reference to the following detailed description taken in conjunction with the accompanying drawings, in which:

BRIEF DESCRIPTION OF THE DRAWINGS

FIG. 1 illustrates an exploded view of an electrolytic cell which may be constructed by the method of the present invention.

FIG. 2 illustrates a formed electrolytic cell which may be constructed by the method of the present invention.

FIG. 3 illustrates a step of forming an inner electrode with an enlarged portion.

FIG. 4 illustrates a step of pouring an electrolyte into the first container electrode.

FIG. 5 illustrates a step of inserting a plug into the first electrode.

FIG. 6 illustrates a step of washing to remove any undesired electrolyte.

FIG. 7 illustrates a step of inserting a second electrode into a hole of the plug.

FIG. 8 illustrates the step of sealing the first electrode with a sealant.

Referring now to the drawings wherein like reference characters designate like or corresponding parts, there is shown in FIGS. 1 and 2 pictorial views of the mechanical structure of an electrolytic cell which may be constructed in accordance with the method of the present invention. There is shown in FIGS. 1 and 2 a first electrode 20, a second electrode 30, and a plug 40. The first electrode 20 includes a first end formed from a lead member 22 and a second end forming an anode 24. The lead 22 may have a head 26 on one end providing a surface area larger than the cross-section of the lead 22 for providing ease of attaching the lead 22 to the anode 24. The lead 22 may be made of any suitable material for leads, such as tinplated copper. The anode 24 is a piece of metal or wire that includes an outer portion of an inert metal such as gold. The anode 24 may be a piece of solid metal, such as a piece of solid gold wire, that has been precut from a spool of gold wire. For example, in a particular application, the anode 24 can be made of a gold wire having relatively small diameter such as a 15 mil diameter and approximately 1.5 inches long.

The anode 24 can be attached to the lead 22 by a suitable welding process such as by percussine arc welding, as shown in FIG. 3. To attach the anode 24 to the lead 22 by percussive arc welding, the anode 24 and the lead 22 are placed so that the anode 24 and the head 26 of the lead 22 are coaxially aligned with one another to provide a predetermined distance or gap between the anode 24 and the head 26 of the lead 22. While driving or ramming the anode 24 into the head 26 of the lead 22, electrical energy is simultaneously provided at the gap. Welding the anode 24 to the head 66 of the lead 22 causes a melting of the metals and provides a weld joint 28 by a fusion of the head 26 of the lead 22 to the anode 24.

It should be readily apparent to those skilled in the art that the first electrode 20 could be made in unity construction such as a continuous piece of gold wire instead of having a lead 22 and an anode 24. However, if constructed of a metal such as gold, the cost of construction will substantially increase the cost of the electrolytic cell which is undesirable. Accordingly, the above described construction of the first electrode 20 provides a means of reducing the total cost of the electrolytic cell.

FIGS. 1 and 2 illustrate the second electrode 30 being provided in the form of a container. The second electrode 30 has an open end 32, a closed end 34, and a wall 36. The wall 36 of the second electrode 30 included an electrochemically active material such as silver. For example, the wall 36 of the second electrode 30 may be made entirely of the active material such as silver or the interior of the wall 36 of the container may include a layer of active material. A lead 44 is attached to the closed end 34 of the first electrode 30. The lead 44 may have a head 46 at one end thereof for providing surface area in which the lead 44 can be attached to the closed end 34 of the second electrode 30. The head 46 of the lead 44 can be attached to the closed end 34 of the second electrode 30 by a suitable welding process such as by percussive arc welding. Prior to the welding of the head 46 of the lead 44 to the closed end 34 of the second electrode 30, it may be desirable to clean the second electrode 30 by a suitable cleaning process to remove any undesirable physical or chemical buildup from the second electrode 30.

There is shown in FIG. 2, an electrolyte 50 included within the second electrode 30 in contact with the first and second electrodes. In FIG. 4 the electrolyte 50 is illustrated as being injected into the second electrode 30 by means of a hypodermic syringe 52. The electrolyte 50 may be drawn into the syringe 52 and then by applying external pressure to the syringe 52, the electrolyte 50 may be placed into the second electrode 30. The electrolyte 50 provides a medium for the transfer of the active material between the first and second electrodes in response to an electric current. For example, the electrolyte 50 may be of the type disclosed in U.S. Pat. No. 3,423,643, issued Jan. 21, 1969, in the name of Edmund A. Miller and assigned to the same assignee as the present application.

Since electrolytes of the type disclosed in the above referenced patent are substantially colorless, it is difficult, if not impossible, to visually see a very small quantity of electrolyte with the naked eye, especially at the bottom of a small enclosure. Therefore, a particular quantity of dye of a desirable color may be mixed to the electrolyte 50 prior to the step of pouring the electrolyte 50 into the first electrode 30. Mixing a dye to the electrolyte 50 has the advantage that throughout the process of constructing of the electrolytic cell, the existence of any quantity of the electrolyte 50 exterior to the electrolytic cell can be readily detected by visual inspection. The dye of course is of a type that will not degrade the operation of the electrolyte 50.

The plug 40 shown in FIGS. 1 and 2 has an opening or hole 42 therethrough and as shown in FIG. 5 the plug 40 is being inserted in the open end 32 of the second electrode 30. The plug 40 is inserted in the open end 32 of the first electrode 30 to a particular position within the wall 36 to form a first interior portion 64 and a second interior portion 66 within the wall 36 of the first electrode 30. More particularly, the plug 40 is inserted within the wall 36 of the first electrode 30 to a position that causes a small portion of the electrolyte 50 to pass throughout the hole 42 in the plug so that the electrolyte 50 completely fills the first interior portion 64. Inserting the plug 40 also removes undesired air pockets within the electrolyte 50 in the first interior portion 64. The plug 40 preferably has an outside dimension a little larger than the inside dimension of the wall 36 of the first electrode 30. Therefore, when the plug 40 is inserted in the wall 36, the plug 30 will be held in place by friction developed between the wall 36 and the plug 40. Furthermore, a tightly fitted plug 40 will prevent the passage of the electrolyte 50 from between the wall 36 of the first electrode 30 and the plug 40. Also, if the plug 40 has larger outside dimension than the wall 36, the hole 42 will be deformed from a straight line of center axis hole. The plug 40 can be made of any suitable material that will not deteriorate when exposed to the particular electrolyte 50. For example, the plug 40 can be made of a suitable rubber or elastomer such as the material sold under the tradename of Viton.

After the plug 40 has been inserted into the open end 32 of the container, the quantity of the electrolyte 50 that has passed through the hole 42 will be disposed in the second interior portion 66 of the first electrode 30. It is desirable to remove any of the electrolyte 50 in the second interior portion 66 by a suitable step of washing as illustrated in FIG. 6. The step of washing can be accomplished by exposing second interior portion 66 to a continuously flowing stream of water for a particular length of time. Even though the hole 42 and the plug 40 is exposed to the water, the water will not mix with the electrolyte 50 in the interior portion 64 due to the surface tension of the electrolyte 50 within the hole 42 and the deformation of the hole 42 in the plug 40. The continuous presence of flowing water for a period of time will substantially remove all of the electrolyte 50 from the second interior portion 66. After the step of washing, a step of drying such as by applying air pressure can be used to remove any of the residue of the water that may be remaining in the second interior portion 66.

There is illustrated in FIG. 7 the first electrode 20 being inserted into the hole 42 of the plug 40. The first electrode 20 may be inserted into the hole 42 of the plug 40 by simultaneously applying a twisting and pushing motion to the first electrode 20 until the enlarged portion 28 comes into physical contact with the plug 40. Therefore, the enlarged portion 28 of the first electrode 20 provides a mechanical stop when the first electrode 20 is inserted in the hole 42 of the plug 40. Having the enlarged portion 28 is very desirable when assembling small devices because it is difficult to determine when the desired amount or length of the anode portion 24 of the first electrode 20 has been inserted into the electrolyte 50. However, by having the enlarged portion 28 on the first electrode 20, the first electrode 20 may be precut and an assembler can easily feel when the enlarged portion 28 comes into physical contact with the plug 40 and thus provide conformity of construction.

When the first electrode 20 is inserted in the hole 42 of the plug 40, some of the electrolyte 50 may escape through the hole 42 and into the second interior portion 66. Consequently, it may be desirable to wash the second interior portion 66 by a suitable washing process to remove the electrolyte 50, such as by a washing process substantially identical to that illustrated and described with reference to FIG. 6.

FIG. 8 illustrates the step of filling the second interior portion 66 with a sealant 80. The sealant 80 may be applied from a tube or a syringe or other suitable means through the open end 32 of the second electrode 30 into the second interior portion 66. The sealant 80 is applied to substantially fill the second interior portion 66 of the second electrode 30. The sealant 80 bonds to the wall 36 the enlarged portion 28, the lead member 22 including the head 26 and the plug 40. The sealant may be a suitable epoxy or similar adhesive that will bond to the particular metals or plastics used in the construction of the electrolytic cell. The sealant 80 should have characteristics such that the sealant 80 will not deteriorate when exposed to the electrolyte 50. Consequently, if any of the electrolyte 50 penetrates to the second interior portion 66 the sealant 80 will not deteriorate. As shown in FIG. 2, the sealant 80 substantially surrounds the weld joint including the enlarged portion 28 and the head 26 the lead 22. Consequently, the sealant 80 also prevents the weld joint and hence the first electrode 20 from being displaced from the assembled position when exposed to a pulling force. Furthermore, the sealant 80 provides additional support to the weld joint by surrounding the weld joint. Also, the sealant 80 provides an insulation between the wall 36 of the second electrode 30 and the lead member 22 so that if the lead member 22 is bent toward the wall 36 of the second electrode 30, the sealant 80 will prevent the lead member 22 from coming into physical and electrical contact with the open end 32 of the second electrode 30.

While the salient features of the present invention have been illustrated and described with respect to a particular embodiment, it should be readily apparent that modifications can be made within the spirit and scope of the invention.

I claim:

1. A method of making an electrolytic cell of the type that includes at least a first inner electrode in contact with an electrolyte contained within a second outer electrode formed as a container; the container including an open end, a closed end, and a wall; the method including the steps of:
   partially filling the container with the electrolyte;
   inserting a plug having at least one hole therethrough into the open end of the container and to a particular depth within the container and with the inserting of the plug removing air pockets from within the container portion containing the electrode;
   inserting the inner electrode through the open end of the container and through the hole of the plug until a particular length of the inner electrode is in contact with the electrolyte,
   sealing the open end of the container with a sealant for preventing the escape of any of the electrolyte and for providing insulation between the first inner electrode and the container and for preventing the inner electrode from being displaced when subjected to a force on the inner electrode, and
   mixing a dye with the electrolyte prior to partially filling the container for providing an electrolyte that can be readily visually detected.

2. The method of making an electrolytic cell of claim 1 further including the step of: cleaning the open end of the container prior to inserting the plug for removing any electrolyte in the open end of the container.

3. The method of making an electrolytic cell of claim 1 further including the step of: cleaning the open end of the container subsequent to inserting the inner electrode through the hole in the plug for removing any electrolyte contained within the open end of the container.

4. A method of making an electrolytic cell, including the steps of:
   forming a first inner electrode, including an anode portion and an enlarged portion,
   partially filling a container electrode with an electrolyte, and with the container having an open end, a closed end, and a wall;
   inserting a plug into the open end of the container, the plug having at least one hole therethrough and with the plug inserted to a particular depth within the container, and with the inserting of the plug removing air pockets from within the portion of the container containing the electrolyte;
   inserting the anode portion of the electrode through the open end of the container and through the hole of the plug until the enlarged portion of the electrode makes a physical contact with the plug within the open end of the container, and;
   sealing the open end of the container with a sealant for preventing the escape of the electrolyte and for providing insulation between the first inner electrode and the wall and for surrounding the enlarged portion to lock the first inner electrode in position.

5. The method of claim 4 further includes the step of mixing a quantity of dye with the electrolyte prior to partially filling the container for providing an electrolyte that can be visually detected.

6. The method of claim 4 further including the step of: washing at least the open end of the container prior to the insertion of the plug for removing any excess electrolyte.

7. The method of claim 4 further including the step of: washing at least the open end of the container and the enclosed portion of the electrode subsequent to the step of inserting the anode portion of the electrode for removing any excess electrolyte.

8. A method of making an electrolytic cell, including the steps of:
   welding a first lead to an electrode, the welding forming a weld joint between the first lead and the electrode;
   partially filling a container with an electrolyte, the container having an open end, a closed end, and a wall;
   inserting a plug into the open end of the container, the plug having at least one hold therethrough and with the plug inserted to a particular depth within the container;
   cleaning at least the open end of the container to remove electrolyte exterior to the plug;

inserting the electrode through the open end of the container and through the hole in the plug into the electrolyte contained within the container until the weld joint makes physical contact with the plug within the open end of the container;

cleaning at least the open end of the container and the weld joint;

sealing the open end of the container for preventing the escape of the electrolyte and for providing insulation between the electrode and the wall portion of the container and for surrounding the weld joint to lock the electrode in position.

9. The method of claim 8 further including the step of mixing a quantity of dye with the electrolyte prior to the step of partially filling the container.

10. The method of claim 8 wherein the steps of cleaning further includes the steps of: washing at least the open end of the container with a liquid to remove any excess electrolyte; and drying at least the open end of the container.

11. A method of making an electrolytic seal, comprising the steps of:

providing a container having an open end, a closed end, and a wall, the wall of the container including an electrochemically active metal;

partially filling the container with an electrolyte;

providing a plug having at least one hole therethrough, the plug being made of a material that will resist deterioration when disposed to the electrolyte;

inserting the plug into the open end of the container to a particular depth within the container; the inserting of the plug providing elimination of any air pockets from the portion of the container containing the electrolyte;

providing an electrode having a lead and an anode welded together at a weld joint therebetween, the anode including an inert metal;

inserting the anode through the open end of the container and through the hole of the plug until the weld joint physically contacts the plug within the open end of the container, and sealing the open end of the container with a sealant, the sealing preventing escape of any of the electrolyte and providing insulation between lead and the container and surrounding the weld joint to lock the electrode in position.

* * * * *